(12) United States Patent
Hochman (10) Patent No.: US 12,481,609 B2
(45) Date of Patent: Nov. 25, 2025

(54) FIFO DATA BUFFER WITH MULTI-LOAD

(71) Applicant: Microsoft Technology Licensing, LLC, Redmond, WA (US)

(72) Inventor: Amiram Hochman, Raanana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/729,643

(22) PCT Filed: Dec. 27, 2022

(86) PCT No.: PCT/US2022/082397
§ 371 (c)(1),
(2) Date: Jul. 17, 2024

(87) PCT Pub. No.: WO2023/146721
PCT Pub. Date: Aug. 3, 2023

(65) Prior Publication Data
US 2025/0094368 A1    Mar. 20, 2025

(30) Foreign Application Priority Data
Jan. 27, 2022   (NL) .................................. 2030739

(51) Int. Cl.
*G06F 13/20*    (2006.01)
*G06F 1/04*    (2006.01)

(52) U.S. Cl.
CPC ............... *G06F 13/20* (2013.01); *G06F 1/04* (2013.01); *G06F 2213/40* (2013.01)

(58) Field of Classification Search
None
See application file for complete search history.

(56) References Cited

U.S. PATENT DOCUMENTS 4,933,901 A     6/1990  Tai et al.
6,145,033 A  *  11/2000  Chee .......................... G06F 5/12
                                              710/60

(Continued)

OTHER PUBLICATIONS

"FIFOs", accessed on link https://web.archive.org/web/20210926013946/https://docs.zephyrproject.org/latest/reference/kernel/data_passing/fifos.html, Sep. 26, 2021, 8 pages.

(Continued)

*Primary Examiner* — Elias Mamo
(74) *Attorney, Agent, or Firm* — Alleman Hall & Tuttle LLP (57) ABSTRACT

One example provides a device comprising a FIFO data buffer comprising a load shift register, a request line encoder, a state machine, and one or more clocks to provide a clock signal. The load shift register comprises a plurality of register locations and is configured to shift data between at least two register locations controllable on at least one shift instruction and to load data into at least one of the register locations controllable on at least one load instruction. The request line encoder is configured to receive one or more requests each comprising a corresponding priority value, and to determine a request number value representing a number of requests to load into the load shift register. The state machine is configured to determine, based at least in part on the request number value, a state, one or more shift instructions, and one or more load instructions.

20 Claims, 7 Drawing Sheets

(56) References Cited

U.S. PATENT DOCUMENTS

| | | | |
|---|---|---|---|
| 6,266,748 B1 | 7/2001 | Bishop | |
| 6,327,625 B1 | 12/2001 | Wang et al. | |
| 6,931,641 B1 * | 8/2005 | Davis | G06F 9/3802 |
| | | | 712/228 |
| 7,080,169 B2 | 7/2006 | Tang et al. | |
| 7,085,880 B2 * | 8/2006 | Johnson | G06F 13/1689 |
| | | | 710/52 |
| 7,106,098 B1 | 9/2006 | Zack et al. | |
| 7,117,287 B2 | 10/2006 | Smith | |
| 7,836,279 B2 * | 11/2010 | Colavin | G06F 9/30134 |
| | | | 712/216 |
| 8,006,244 B2 | 8/2011 | Davis et al. | |

OTHER PUBLICATIONS

International Search Report and Written Opinion received for PCT Application No. PCT/US22/082397, Apr. 13, 2023, 12 pages.
Search Report and Written Opinion Issued in Netherland Patent Application No. N2030739, Sep. 7, 2022, 9 pages.

* cited by examiner

FIFO DATA BUFFER WITH MULTI-LOAD

CROSS REFERENCE TO RELATED APPLICATIONS

The present application is a U.S. National Phase of International Patent Application Serial No. PCT/US2022/082397 entitled "FIFO DATA BUFFER WITH MULTI-LOAD", filed Dec. 27, 2022, which claims priority to Netherlands Patent Application Serial No. 2030739, filed Jan. 27, 2022, the entire contents of each of which are hereby incorporated by reference for all purposes.

BACKGROUND

First in first out (FIFO) data buffers may be used on computing devices to buffer data being sent from a first location to a second location by processing data within the FIFO data buffer in an order in which the data was received.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One example provides a device comprising a FIFO data buffer comprising a load shift register, a request line encoder, a state machine, and one or more clocks to provide a clock signal to the load shift register, the request line encoder, and the state machine. The load shift register comprises a plurality of register locations. The load shift register is configured to shift data between at least two register locations of the plurality of register locations controllable on at least one shift instruction, and to load data into at least one of the plurality of register locations controllable on at least one load instruction. The request line encoder is configured to receive one or more requests each comprising a corresponding priority value. The request line encoder is further configured to determine a request number value based at least in part on the one or more requests received, one or more requests currently loaded in the load shift register and a state. The request number value representing a number of the one or more requests to load into the load shift register. The state machine is configured to determine, based at least in part on the request number value, the state, one or more shift instructions, and one or more load instructions.

DETAILED DESCRIPTION

Computing devices may send data between processing and/or storage locations within the device. For example, some computing devices are configured as dual-screen devices that comprise a logic device associated with each screen of the device. In such a device, a first logic device may communicate data, such as an input/output (IO) request, to a second logic device via a FIFO data buffer.

In some such devices, a FIFO data buffer may receive multiple IO requests within a single clock cycle. The average input data rate is generally lower than the output data rate over time, but the input rate may exceed the output rate at times. One solution to address the multiple IO requests within the single clock cycle is to use a FIFO data buffer that is configured to accommodate a lower output rate than an input rate for a suitable duration. However, such a FIFO data buffer may be relatively large. A large FIFO data buffer may increase a circuit gate count relative to a smaller queue, and thus may increase a circuit area and/or an amount of power consumed. In examples where the computing device is a mobile device, the mobile device may be powered by a battery comprising a limited amount of available power.

Accordingly, examples are disclosed that relate to a computing device comprising a FIFO data buffer configured to load one or more requests in a first in first serve algorithm with a priority sort order, in case more than one request is received in a same clock cycle. Briefly, the FIFO data buffer according to the present examples comprises a load shift register, a request line encoder, and a state machine. The load shift register is configured to shift data between at least two register locations of the load shift register, and to load data into at least one register of the load shift register. Such a load shift register may enable loading data into more than one register of the load shift register and therefore may help to reduce a size of the FIFO data buffer over a larger data buffer configured to accommodate a lower output rate than an input rate. The request line encoder is configured to receive one or more requests, and to determine a number of the one or more requests to load into the load shift register. The state machine is configured to determine a state, one or more shift instructions based at least upon the state, and/or one or more load instructions based at least upon the state. The state, the one or more shift instructions, and the one or more load instructions can be based at least in part on the one or more requests received and one or more requests loaded in the load shift register.

Figure 1:
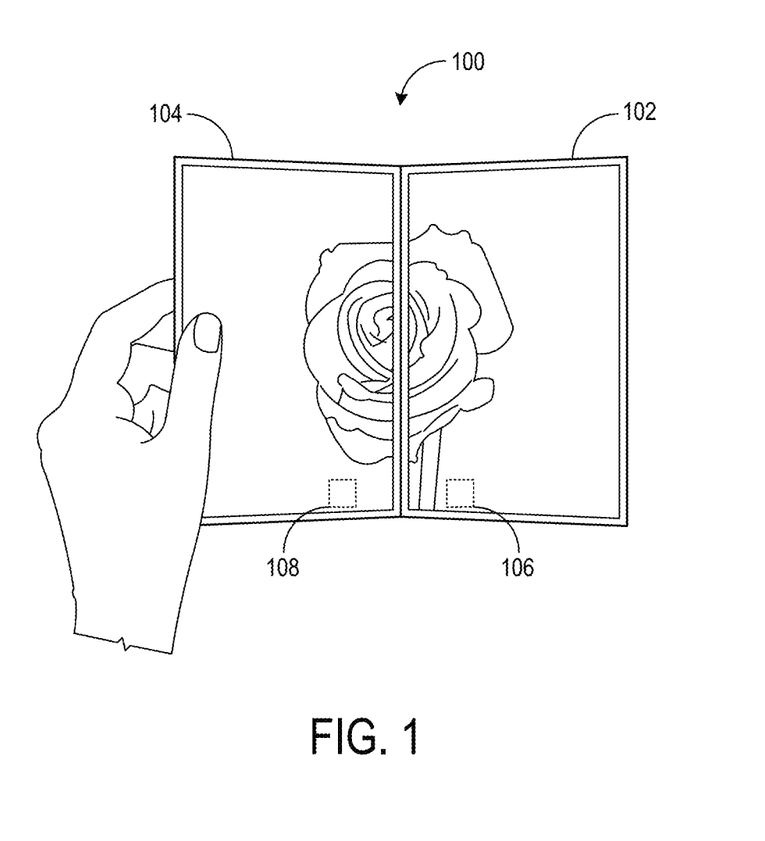
FIG. 1 shows an example dual-screen computing device.

FIG. 1 shows an example device 100 that utilizes a FIFO data buffer. Device 100 comprises a first screen 102, a second screen 104, a first logic device 106, and a second logic device 108 connected to first logic device 106. First logic device 106 sends data via a packet generator to second logic device 108. In some examples, the packet generator may use a FIFO data buffer as an encoder for the data. In some examples, first logic device 106 may send, or reflect, an IO request on first screen 102 to second logic device 108. In such examples, the FIFO data buffer may buffer a plurality of IO requests from first logic device 106 as part of the packet generator.

Figure 2:
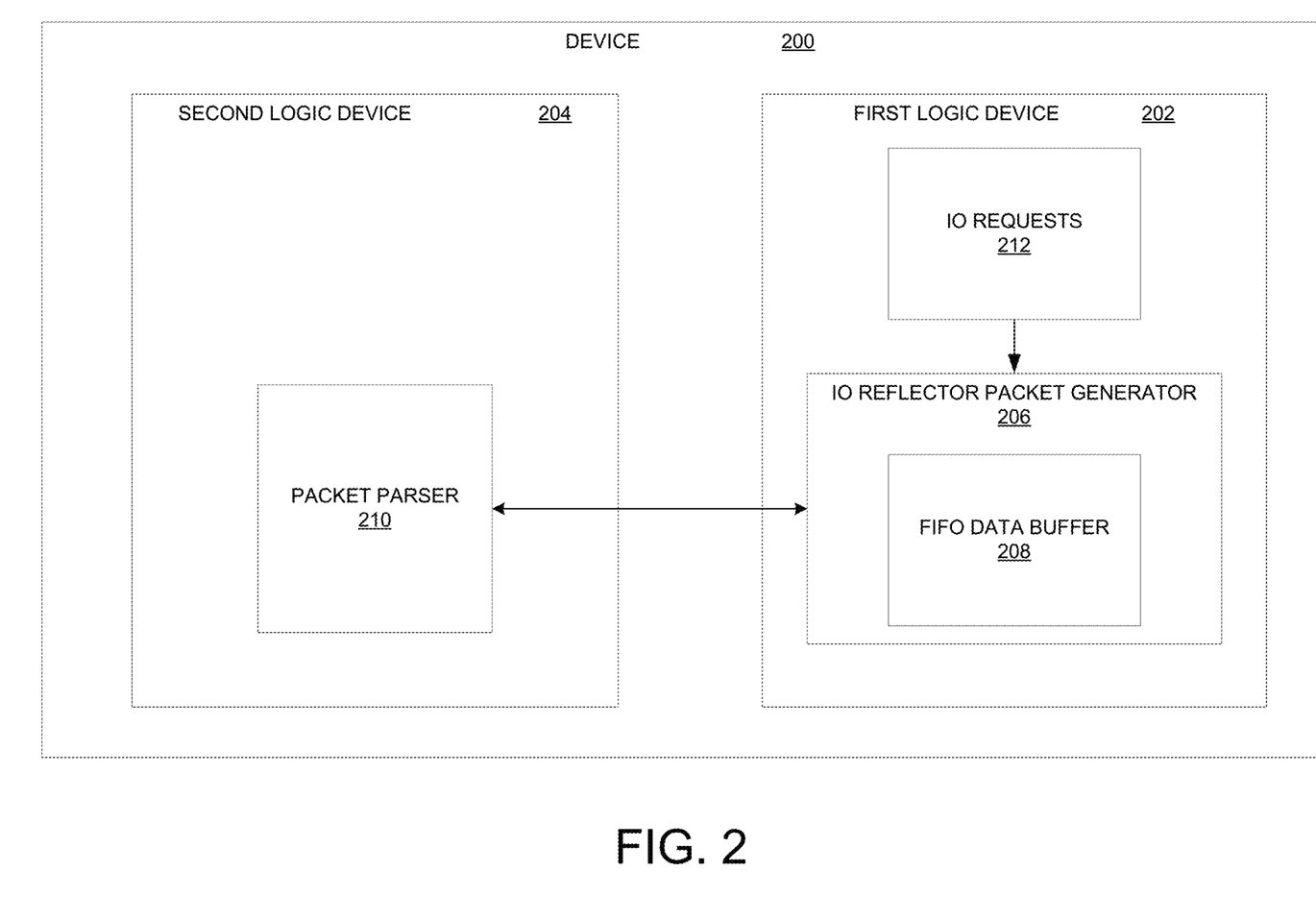
FIG. 2 shows a block diagram of an example dual-screen device utilizing a FIFO data buffer.

FIG. 2 shows a block diagram of an example device 200. Device 100 is an example of device 200. Device 200 comprises a first logic device 202 and a second logic device 204 connected to first logic device 202. First logic device 202 comprises an input/output, IO, reflector packet generator 206 comprising a FIFO data buffer 208, and second logic device 204 comprising a packet parser 210. IO reflector packet generator 206 receives a plurality of IO requests 212, and generates packet data comprising data related to the plurality of IO requests 212. Further, IO reflector packet generator 206 may use FIFO data buffer 208 to help buffer IO requests 212, as discussed in more detail below. In some examples, each IO request of the plurality of IO requests 212 comprises a corresponding priority value. In some instances, IO reflector packet generator 206 may receive the plurality of IO requests 212 in a single clock cycle, as will be discussed below. In such instances, FIFO data buffer 208 may sort the plurality of IO requests 212 according to the corresponding priority value, as will be discussed in more detail below. In the depicted example, IO reflector packet generator 206 sends the packet data generated to packet parser 210 via a high-speed connection such as a serializer/deserializer. In other examples, any suitable connection may be used to send the packet data generated. Further examples of devices that can utilize a FIFO data buffer include, but are not limited to, tablet computers, head-mounted computing systems (e.g. augmented reality and virtual reality head-mounted display devices), and wrist worn computing systems.

Figure 3:
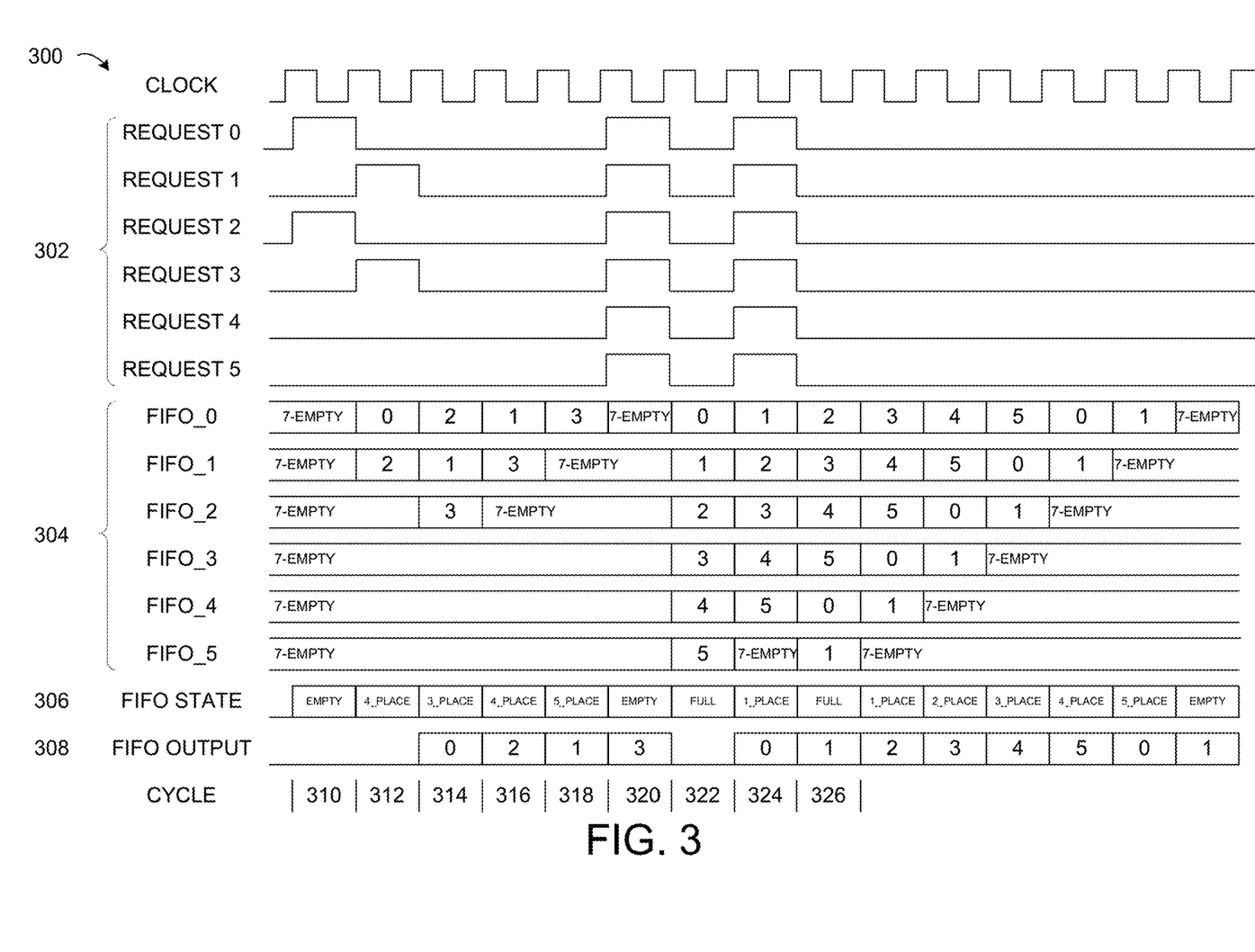
FIG. 3 shows an example timing diagram for a FIFO data buffer.

As mentioned above, A FIFO data buffer may be configured to buffer data before the data is sent in a data packet. FIG. 3 shows an example timing diagram 300 for such a FIFO data buffer. FIFO data buffer 208 is an example of a FIFO data buffer that may operate according to timing diagram 300. Briefly, the FIFO data buffer receives a plurality of requests 302, loads plurality of requests 302 into a load shift register comprising a plurality of register locations 304, updates a state 306 of a state machine of the FIFO data buffer, and outputs a FIFO output 308. In the depicted example, each request of plurality of requests 302 comprises a corresponding priority value. As a specific example, request 0, corresponding to a priority value of "0," has a higher priority than request 2, corresponding to a priority value of "2". Each request of plurality of requests 302 is depicted as a single bit for simplicity. In other examples, each request may comprise any suitable number of bits. In some examples, each request of plurality of requests 302 comprise at least an IO request.

In this example, in first cycle 310, the load shift register is empty as indicated by "7-EMPTY" in each register location of plurality register locations 304, and as such state 306 comprises an "EMPTY" state. In the depicted example, a "7" in a register location is used to indicate that no requests are loaded in the register location, and a label of "7-EMPTY" is shown. In other examples, any suitable value may be used to indicate that a register location has no requests loaded. In first cycle 310, request 0 and request 2 are received and sorted in a priority order of request 0 and request 2. In second cycle 312, request 0 and request 2 are loaded into plurality of register locations 304 in priority order as indicated by a "0" in register location FIFO_0 and a "2" in register location FIFO_1. State 306 is updated to "4_PLACE" indicating four empty register locations. Further, in second cycle 312, request 1 and request 3 are received and are sorted in a priority order of request 1 and request 3.

In third cycle 314, the contents of plurality of register locations 304 (requests in this example) are shifted to a next register location. Further, the request loaded in output register location FIFO_0 is shifted out of the load shift register onto FIFO output 308. As a specific example, "0" is loaded in the output register location FIFO_0 and is shifted out onto FIFO output 308. Further, request 1 and request 3 are loaded into the load shift register behind the requests loaded in plurality of register locations 304 such that the contents in plurality of register locations 304 are updated to "2", "1", "3". Further, state 306 is updated to "3_PLACE" indicating three empty register locations. In each of fourth, fifth, and sixth cycles 316, 318, 320, the requests loaded in plurality of register locations 304 are shifted to the next register location, the request loaded in the output register location FIFO_0 is shifted out of the load shift register onto FIFO output 308, and state 306 is updated.

In seventh cycle 322, the requests received in sixth cycle 320 are loaded into plurality of register locations 304 in a priority sort order of request 0, request 1, request 2, request 3, request 4, and request 5. Further, state 306 is updated to "FULL" indicating plurality of register locations 304 is full. In eighth cycle 324, the requests loaded in plurality of register locations 304 are shifted to the next register location, the request loaded in the output register location FIFO_0 is shifted onto FIFO output 308, and state 306 is updated to "1_PLACE" indicating one empty register location. Further, request 0, request 1, request 2, request 3, request 4, and request 5 are received in eighth cycle 324.

In the depicted example, a request is determined to be an active request when the request is not one of the one or more requests loaded in the load shift register. If determined to be active, the active request is loaded into the load shift register. Where a request is determined to not be the active request, the active request is not loaded into the load shift register. The determination of whether the request is the active request or not the active request may help to improve an efficiency of managing a flow of data into the load shift register. As an example, in ninth cycle 326, the requests loaded in plurality of register locations 304 are updated as discussed above to "2", "3", "4", and "5" and request 0 is determined to be an active request as "0" is not loaded in plurality of register locations 304. Similarly, request 1 is determined to be an active request. The active request 0 and the active request 1 are loaded into the load shift register behind the requests loaded in plurality of register locations 304 in ninth cycle 326. Request 2, request 3, request 4, and request 5 are each determined to not be the active request and are not loaded into plurality of register locations 304. Further, state 306 is updated to "FULL." Timing diagram 300 is intended to be illustrative, and any other suitable timing diagram may be used.

A FIFO data buffer configured to operate according to timing diagram 300 can receive a plurality of requests, can sort the plurality of requests according to a corresponding priority value, and can load the plurality of requests sorted into a load shift register of the FIFO data buffer in a single cycle. Further, when a request is determined to be an active request, the active request is loaded into the load shift register, and when a request is determined to not be the active request, the request is not loaded into the load shift register.

Figure 4:
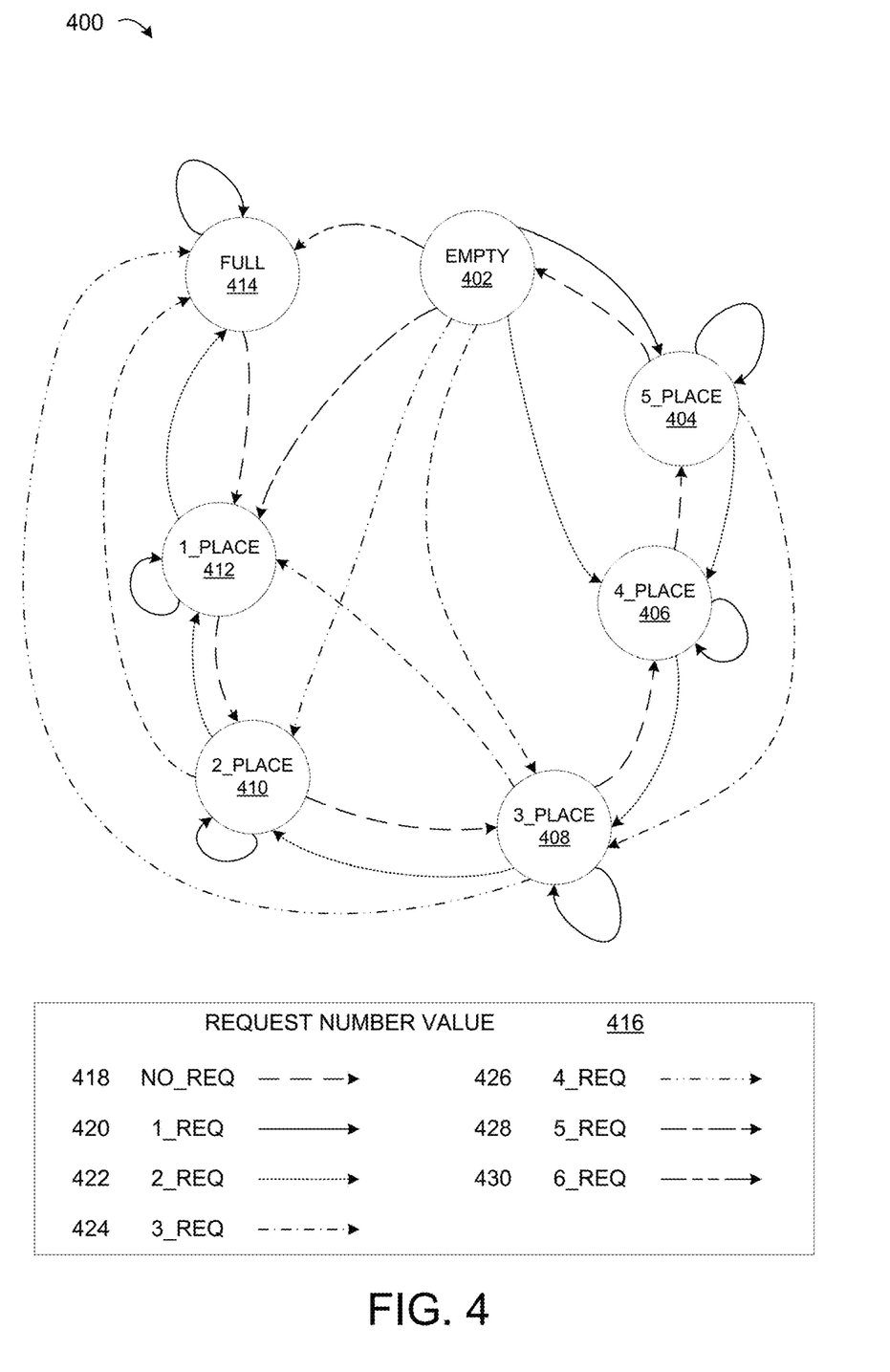
FIG. 4 shows an example state transition diagram utilized by the timing diagram of FIG. 3.

As previously discussed, state 306 can update based at least in part on the plurality of requests 302 received. FIG. 4 illustrates an example state transition diagram 400 that may be utilized by timing diagram 300 for updating state 306. State transition diagram 400 is implemented via a hardware state machine on a computing device to perform the transitions illustrated in FIG. 4. State transition diagram 400 comprises an empty state 402, a 5_PLACE state 404, a 4_PLACE state 406, a 3_PLACE state 408, a 2_PLACE state 410, a 1_PLACE state 412, and a full state 414. In some examples, each state may indicate a number of empty register locations in a load shift register of a FIFO data buffer. As specific examples, 5_PLACE state 404 indicates that five register locations are empty, and full state 414 indicates that the load shift register is full (e.g. zero register locations are empty). In other examples, each state may indicate any other suitable status of the FIFO data buffer. In some examples, state transition diagram 400 may comprise any suitable number of states.

State transition diagram 400 can transition between states based on a request number value 416 representing a number of requests to load into the load shift register. Referring to FIG. 3, in second cycle 312, the request number value is two, representing that the number of requests to load into the load shift register is two. As further examples, the request number value is two in third cycle 314, and the request number value is six in seventh cycle 322. Further, as previously discussed, two requests are loaded in ninth cycle 326, and as such the request number value is two in ninth cycle 326. Returning to FIG. 4, a first state can transition to a second state based on request number value 416. As a specific example, empty state 402 transitions to 4_PLACE state 306 based on when request number value 416 is 2 as indicated by 2_REQ 422. As another example, 5_PLACE state 404 transitions to empty state 402 based on when request number value 416 is zero as indicated by NO_REQ 418. State transition diagram 400 is intended to be illustrative, and any other suitable state transition diagram may be used in other examples.

Figure 5:
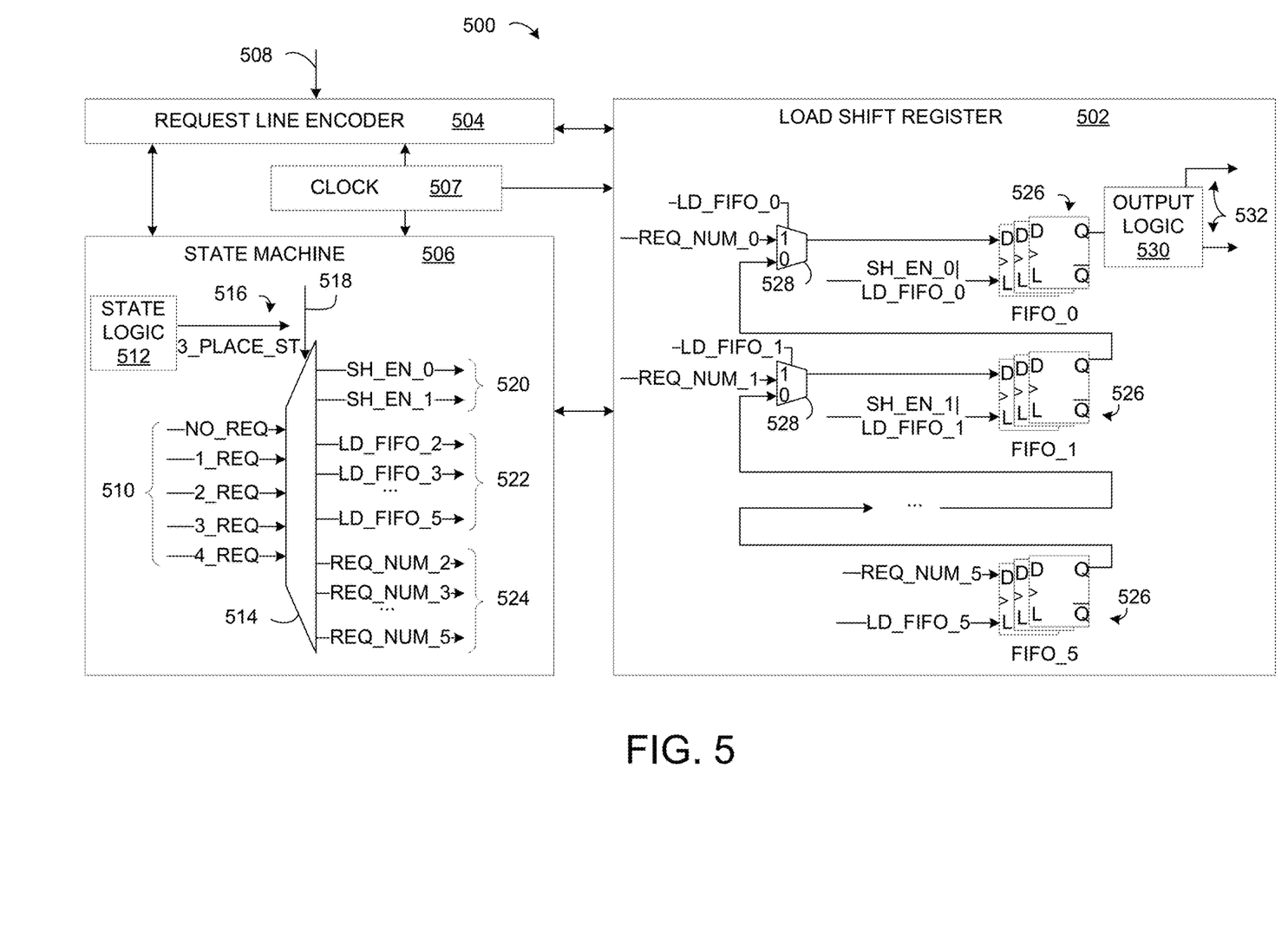
FIG. 5 shows a block diagram of an example FIFO data buffer.

As previously discussed, a FIFO data buffer may operate according to state transition diagram 400 and timing diagram 300. FIG. 5 shows a block diagram of such an example FIFO data buffer 500. FIFO data buffer 208 is an example of FIFO data buffer 500. In some examples, FIFO data buffer 500 can be implanted via hardware circuits. FIFO data buffer 500 comprises a load shift register 502, a request line encoder 504, a state machine 506, and a clock 507. Clock 507 is configured to send a clock signal to load shift register 502, request line encoder 504, and state machine 506. Request line encoder 504 is configured to receive one or more requests 508. In some examples, each request of one or more requests 508 can comprise a corresponding priority value, as previously discussed. In some examples, one or more requests 508 can comprise at least an IO request. In other examples, one or more requests 508 can comprise any suitable request and/or any suitable corresponding value.

Request line encoder 504 is further configured to determine a request number value 510 representing a number of the one or more requests to load into the load shift register. Request number value 510 may help to improve an efficiency of managing a flow of data into load shift register 502. As previously discussed, when the number of requests to load into the load shift register is two, request number value 510 is two as indicated by "2_REQ." Request number value 510 can be determined based at least in part on one or more requests 508 and one or more requests loaded in load shift register 502. Further, request line encoder 504 is configured to, for each request of one or more requests 508, determine whether the request is an active request. As mentioned above, an active request is a request that is not currently loaded in the load shift register 502. In the examples where each request comprises the corresponding priority value, request line encoder 504 is configured to sort the one or more active requests based at least on the corresponding priority value, and to provide the one or more active requests to load shift register 502. In some such examples, the one or more active requests may be sorted in a priority order such that a request with a higher corresponding priority value proceeds a request with a lower corresponding priority value. Such a sorted priority order may help to load the request with the higher corresponding priority value before the request with the lower corresponding priority value.

State machine 506 comprises state logic 512 and instruction generator 514. State logic 512 is configured to determine a state, and to update the state based at least in part on the request number value. The state updated may help to improve an efficiency of managing a flow of data into load shift register 502. In some examples, state logic 512 can determine and/or update the state according to state transition diagram 400. State logic 512 sends the state to instruction generator 514 as indicated at 516. In the depicted example, instruction generator 514 receives a 3_PLACE_ST from state logic 512. In other examples where instruction generator 514 receives another state, a list of logic may comprise shift instructions SH_EN_0 to SH_EN_4, load instructions LD_FIFO_0 to LD_FIFO_5, and request number values NO_REQ, 1_REQ to 6_REQ. Instruction generator receives request number value 510 and requests loaded into load shift register 502 as indicated at 518. Instruction generator 514 can generate one or more shift instructions 520 and one or more load instructions 522. One or more shift instructions 520 and one or more load instructions may help to control load shift register 502. In some examples, each of one or more shift instructions 520 and one or more load instructions 522 can be based at least in part on request number value 510, the state from state logic 512, and the one or more requests loaded in load shift register 502. Further, instruction generator 514 can provide the one or more requests to load into load shift register 502, as indicated at 524. In some examples, the one or more requests provided at 524 are sorted based at least in part on the corresponding priority value.

Load shift register 502 comprises a plurality of register locations 526, a plurality of corresponding muxes 528, and optional output logic 530. In the depicted example, load shift register 502 comprises six register locations, or a FIFO depth of six. For clarity, register location FIFO_5, register location FIFO_1, and register location FIFO_0 are shown, and load shift register 502 may comprise other register locations and muxes that are not shown. In other examples, any other suitable number of register locations may be used.

Load shift register 502 is configured to shift data between at least two register locations of plurality of register locations 526 controllable on at least one shift instruction 520, and to load data into at least one of plurality of register locations 526 controllable on at least one load instruction 522. As a specific example, an output of the corresponding mux of register location FIFO_0 is loaded into register location FIFO_0 based on a shift instruction SH_EN_0 or on a load instruction LD_FIFO_0. The corresponding mux of register location FIFO_0 is controllable on the load instruction LD_FIFO_0 to select an output of register location FIFO_1 or load data REQ_NUM_0. In some examples, load shift register 502 is configured to load a plurality of requests in a single clock cycle. Such a configuration may help to improve an efficiency of loading multiple requests into load shift register 502. In the depicted example, each register location of register locations 526 comprises 3 bits. In other examples, any other suitable number of bits may be used.

In the depicted example, a request loaded in an output register location FIFO_0 is shifted out to output logic 530. In some examples, output logic 530 can perform any suitable post processing on the output of output register location FIFO_0 and can generate one or more outputs 532. In other examples, output logic 530 can be omitted.

Figure 6:
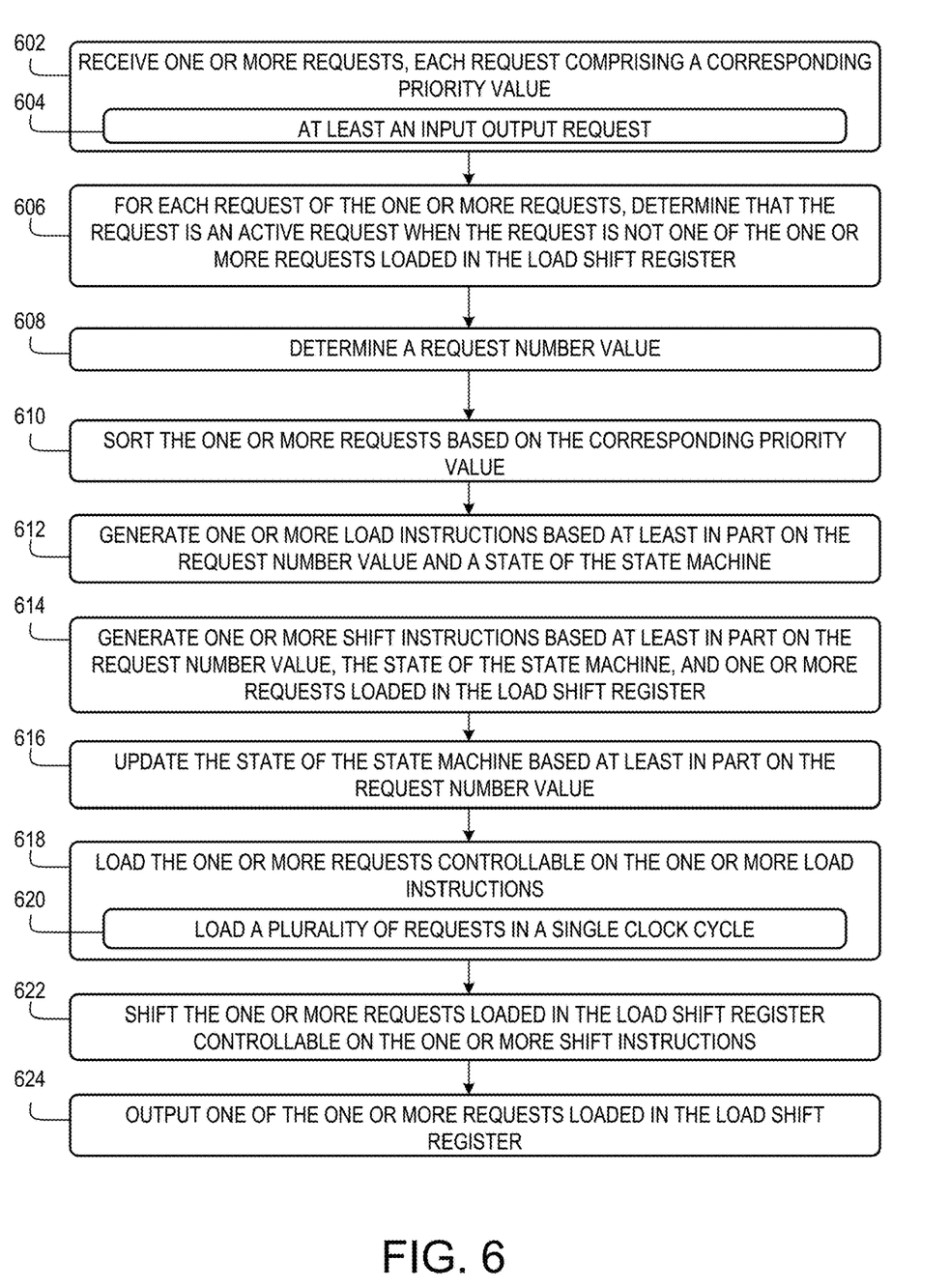
FIG. 6 shows a flow diagram of an example method of operating a FIFO data buffer.

As previously mentioned, FIFO data buffer 500 may operate according to timing diagram 300 and state transition diagram 400. FIG. 6 shows a flow diagram of an example method 600 for operating a FIFO data buffer comprising a load shift register, a request line encoder, and a state machine, such as FIFO data buffer 500 or FIFO data buffer 208. Method 600 may be enacted on device 100 or device 200, for example. Method 600 comprises, at 602, receiving one or more requests, each request comprising a corresponding priority value. In some examples, the one or more requests comprise at least an input output request, as indicated at 604, and thereby may enable the FIFO data buffer to handle input output requests. Method 600 further comprises, at 606, for each request of the one or more requests, determining, via the request line encoder, that the request is an active request when the request is not one of one or more requests loaded in the load shift register. A request determined to be active is loaded into the load shift register, and a request that is determined not to be active is not loaded into the load shift register. Method 600 comprises, at 608, determining, via the request line encoder, a request number value, the request number value representing a number of the one or more requests to load into the load shift register. In some examples, the request line number can be based at least in part on the one or more requests and the one or more requests loaded in the load shift register. Method 600 further comprises sorting the one or more requests based on the corresponding priority value, at 610. In some examples, the one or more requests sorted may comprise a sort order of a request with a higher priority value preceding a request with a lower priority value. In other examples, any other suitable sort order may be used.

Continuing, method 600 comprises generating, via the state machine, one or more load instructions based at least in part on the request number value and a state of the state machine, at 612. In some examples, the one or more load instructions may be further based on the one or more requests loaded in the load shift register. In some examples, the state may indicate a status of the load shift register. For example, the state may represent a number of empty register locations in the load shift register. In other examples, the state may indicate any other suitable status of the FIFO data buffer. Method 600 further comprises generating, via the state machine, one or more shift instruction based at least in part on the request number value, the state of the state machine, and the one or more requests loaded in the load shift register, at 614. Method 600 comprises, at 616, updating the state of the state machine based at least in part on the request number value. In some examples, the state can be updated according to state transition diagram 400, or in other examples any suitable state transition diagram.

Method 600 comprises, at 618, loading the one or more requests into the load shift register controllable on the one or more load instructions. For each request of the one or more requests, when the request is determined to be an active request, the request is loaded into the load shift register, and when the request is determined to not be an active request, the request is not loaded into the load shift register. In the examples where the one or more requests are sorted, the one or more requests sorted are loaded into the load shift register. In some examples, a plurality of requests are loaded into the load shift register in a single clock cycle, as indicated at 620. In some such examples, the plurality of requests are sorted based on the corresponding priority value. Method 600 comprises, at 622, shifting the one or more requests loaded in the load shift register controllable on the one or more shift instructions. Method 600 comprises, at 624, outputting one of the one or more requests loaded in the load shift register. As an example, a request loaded in an output register location of the load shift register is shifted out of the load shift register.

Thus, a FIFO data buffer according to the disclosed examples may help to buffer IO requests in a packet generator using a smaller gate count than a FIFO data buffer that is configured to compensate for a lower output rate than an input rate.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
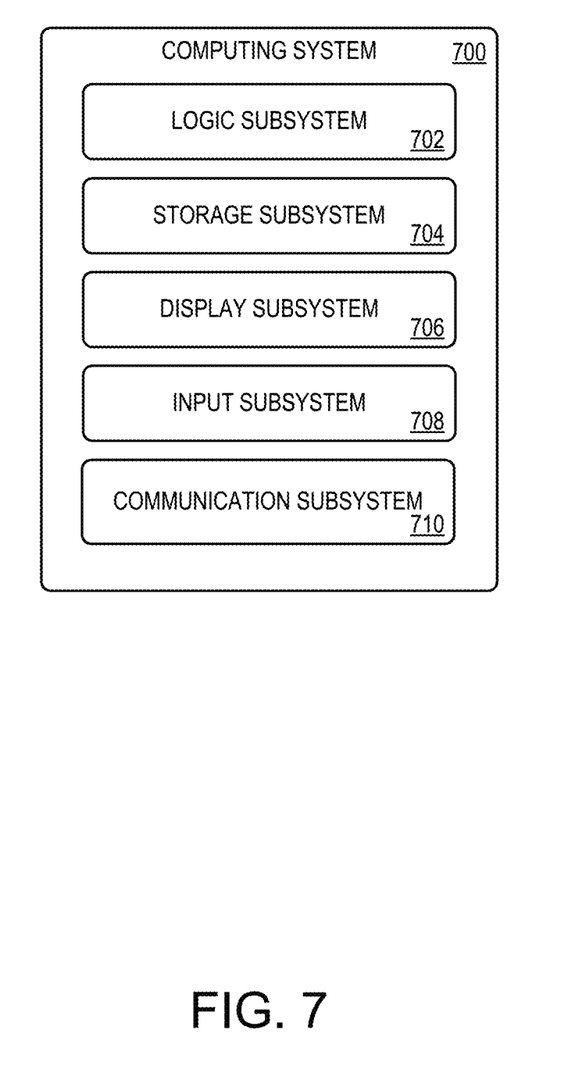
FIG. 7 shows a block diagram of an example computing system.

FIG. 7 schematically shows a non-limiting embodiment of a computing system 700 that can enact one or more of the methods and processes described above. Computing system 700 is shown in simplified form. Device 100 and device 200 are examples of computing system 700. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a device comprising a first in first out, FIFO data buffer comprising a load shift register comprising a plurality of register locations, the load shift register being configured to shift data between at least two register locations of the plurality of register locations controllable on at least one shift instruction, and to load data into at least one of the plurality of register locations controllable on at least one load instruction; a request line encoder configured to receive one or more requests each comprising a corresponding priority value, and to determine a request number value based at least in part on the one or more requests received, one or more requests currently loaded in the load shift register, and a state, the request number value representing a number of the one or more requests received to load into the load shift register; and a state machine configured to determine, based at least in part on the request number value, the state, one or more shift instructions, and one or more load instructions; and one or more clocks to provide a clock signal to the load shift register, the request line encoder, and the state machine. In some such examples, the load shift register is alternately or additionally configured to load a plurality of requests in a single clock cycle. In some such examples, the request line encoder is alternately or additionally configured to determine that a request is an active request when the request is not one of the one or more requests currently loaded in the load shift register, and to provide the active request to the load shift register. In some such examples, the request line encoder is alternately or additionally configured to sort the one or more active requests based at least on the corresponding priority value. In some such examples, the one or more requests alternately or additionally comprise at least an input output (IO) request. In some such examples, the device alternately or additionally comprises a dual-screen device. In some such examples, the state machine is alternately or additionally configured to update the state based at least in part on the request number value. In some such examples, the device alternately or additionally comprising a clock.

Another example provides a method enacted on a device comprising a first in first out (FIFO) data buffer, the FIFO data buffer comprising a load shift register, a request line encoder, and a state machine. The method comprises receiving one or more requests, each request comprising a corresponding priority value, determining, via the request line encoder, a request number value representing a number of the one or more requests to load into the load shift register, sorting the one or more requests based on the corresponding priority value, generating, via the state machine, one or more load instructions based at least in part on the request number value and a state of the state machine, loading the one or more requests sorted into the load shift register controllable on the one or more load instructions, and outputting one of the one or more requests loaded in the load shift register. In some such examples, loading the one or more requests sorted alternately or additionally comprises loading a plurality of request sorted in a single clock cycle. In some such examples, the method alternately or additionally comprises updating the state of the state machine based at least in part on the request number value. In some such examples, the method alternately or additionally comprises generating, via the state machine, one or more shift instructions based at least in part on the request number value, the state of the state machine, and one or more requests loaded in the load shift register, and shifting the one or more requests loaded in the load shift register controllable on the one or more shift instructions. In some such examples, the one or more requests alternately or additionally comprises at least an input output request. In some such examples, the device alternately or additionally comprises a dual screen device. In some such examples, the method alternately or additionally comprises determining that a request is an active request when the request is not one of the one or more requests loaded in the load shift register, and wherein loading the one or more requests comprises, for each request of the one or more requests, loading the request when the request is the active request, and not loading the request when the request is not the active request.

Another example provides a method enacted on a device comprising a first in first out (FIFO) data queue, the FIFO data queue comprising a load shift register, a request line encoder, and a state machine. The method comprises receiving one or more requests each comprising a corresponding priority value; for each of the one or more requests, determining, via the request line encoder, that a request is an active request when the request is not one of the one or more requests loaded in the load shift register; determining, via the request line encoder, a request number value based at least in part on the one or more requests and one or more requests loaded in the load shift register, the request number value representing a number of the one or more requests to load into the load shift register; generating, via the state machine, one or more load instructions based at least in part on the request number value, a state of the state machine, and the one or more requests loaded into the load shift register; for each request of the one or more requests, loading the request into the load shift register controllable on the one or more load instructions when the request is the active request; and outputting one of the one or more requests loaded in the load shift register. In some such examples, loading the one or more active requests alternately or additionally comprises loading a plurality of active requests in a single clock cycle. In some such examples, the method alternately or additionally comprises updating the state of the state machine based at least in part on the request number value. In some such examples, the method alternately or additionally comprises generating, via the state machine, one or more shift instructions based at least in part on the request number value, the state of the state machine, and one or more requests loaded in the load shift register, and shifting the one or more requests loaded in the load shift register controllable on the one or more shift instructions. In some such examples, the method alternately or additionally comprises sorting the one or more requests based on the corresponding priority value. In some such examples, the one or more requests alternately or additionally comprises at least an input output request.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A device, comprising:
   a first in first out, FIFO data buffer comprising
       a load shift register comprising a plurality of register locations, the load shift register being configured to shift data between at least two register locations of the plurality of register locations controllable on at least one shift instruction, and to load data into at least one of the plurality of register locations controllable on at least one load instruction;
       a request line encoder configured to receive one or more requests each comprising a corresponding priority value, and to determine a request number value based at least in part on the one or more requests received, one or more requests currently loaded in the load shift register, and a state, the request number value representing a number of the one or more requests received to load into the load shift register, and
       a state machine configured to determine, based at least in part on the request number value, the state, one or more shift instructions, and one or more load instructions; and
   one or more clocks to provide a clock signal to the load shift register, the request line encoder, and the state machine.

2. The device of claim 1, wherein the load shift register is further configured to load a plurality of requests in a single clock cycle.

3. The device of claim 1, wherein the request line encoder is further configured to determine that a request is an active request when the request is not one of the one or more requests currently loaded in the load shift register, and to provide the active request to the load shift register.

4. The device of claim 3, wherein the request line encoder is further configured to sort the one or more active requests based at least on the corresponding priority value.

5. The device of claim 1, wherein the one or more requests comprise at least an input output (IO) request.

6. The device of claim 1, wherein the device comprises a dual-screen device.

7. The device of claim 1, wherein the state machine is further configured to update the state based at least in part on the request number value.

8. A method enacted on a device comprising a first in first out (FIFO) data buffer, the FIFO data buffer comprising a load shift register, a request line encoder, and a state machine, the method comprising:
   receiving one or more requests, each request comprising a corresponding priority value;
   determining, via the request line encoder, a request number value based at least in part on the one or more requests and one or more requests loaded in the load shift register, the request number value representing a number of the one or more requests to load into the load shift register;
   sorting the one or more requests based on the corresponding priority value;
   generating, via the state machine, one or more load instructions based at least in part on the request number value and a state of the state machine;
   loading the one or more requests sorted into the load shift register controllable on the one or more load instructions; and
   outputting one of the one or more requests loaded in the load shift register.

9. The method of claim 8, wherein loading the one or more requests sorted comprises loading a plurality of requests sorted in a single clock cycle.

10. The method of claim 8, further comprising updating the state of the state machine based at least in part on the request number value.

11. The method of claim 8, further comprising
   generating, via the state machine, one or more shift instructions based at least in part on the request number value, the state of the state machine, and one or more requests loaded in the load shift register; and shifting the one or more requests loaded in the load shift register controllable on the one or more shift instructions.

12. The method of claim 8, wherein the one or more requests comprises at least an input output request.

13. The method of claim 8, wherein the device comprises a dual screen device.

14. The method of claim 8, further comprising determining that a request is an active request when the request is not one of the one or more requests loaded in the load shift register, and wherein loading the one or more requests comprises, for each request of the one or more requests, loading the request when the request is the active request, and not loading the request when the request is not the active request.

15. A method enacted on a device comprising a first in first out (FIFO) data queue, the FIFO data queue comprising a load shift register, a request line encoder, and a state machine, the method comprising:

receiving one or more requests each comprising a corresponding priority value;

for each of the one or more requests, determining, via the request line encoder, that a request is an active request when the request is not one of the one or more requests loaded in the load shift register;

determining, via the request line encoder, a request number value based at least in part on the one or more requests and one or more requests loaded in the load shift register, the request number value representing a number of the one or more requests to load into the load shift register;

generating, via the state machine, one or more load instructions based at least in part on the request number value, a state of the state machine, and the one or more requests loaded into the load shift register;

for each request of the one or more requests, loading the request into the load shift register controllable on the one or more load instructions when the request is the active request; and outputting one of the one or more requests loaded in the load shift register.

16. The method of claim 15, wherein loading the one or more active requests comprises loading a plurality of active requests in a single clock cycle.

17. The method of claim 15, further comprising updating the state of the state machine based at least in part on the request number value.

18. The method of claim 15, further comprising generating, via the state machine, one or more shift instructions based at least in part on the request number value, the state of the state machine, and one or more requests loaded in the load shift register; and shifting the one or more requests loaded in the load shift register controllable on the one or more shift instructions.

19. The method of claim 15, further comprising sorting the one or more requests based on the corresponding priority value.

20. The method of claim 15, wherein the one or more requests comprises at least an input output request.

* * * * *